Figure 1:
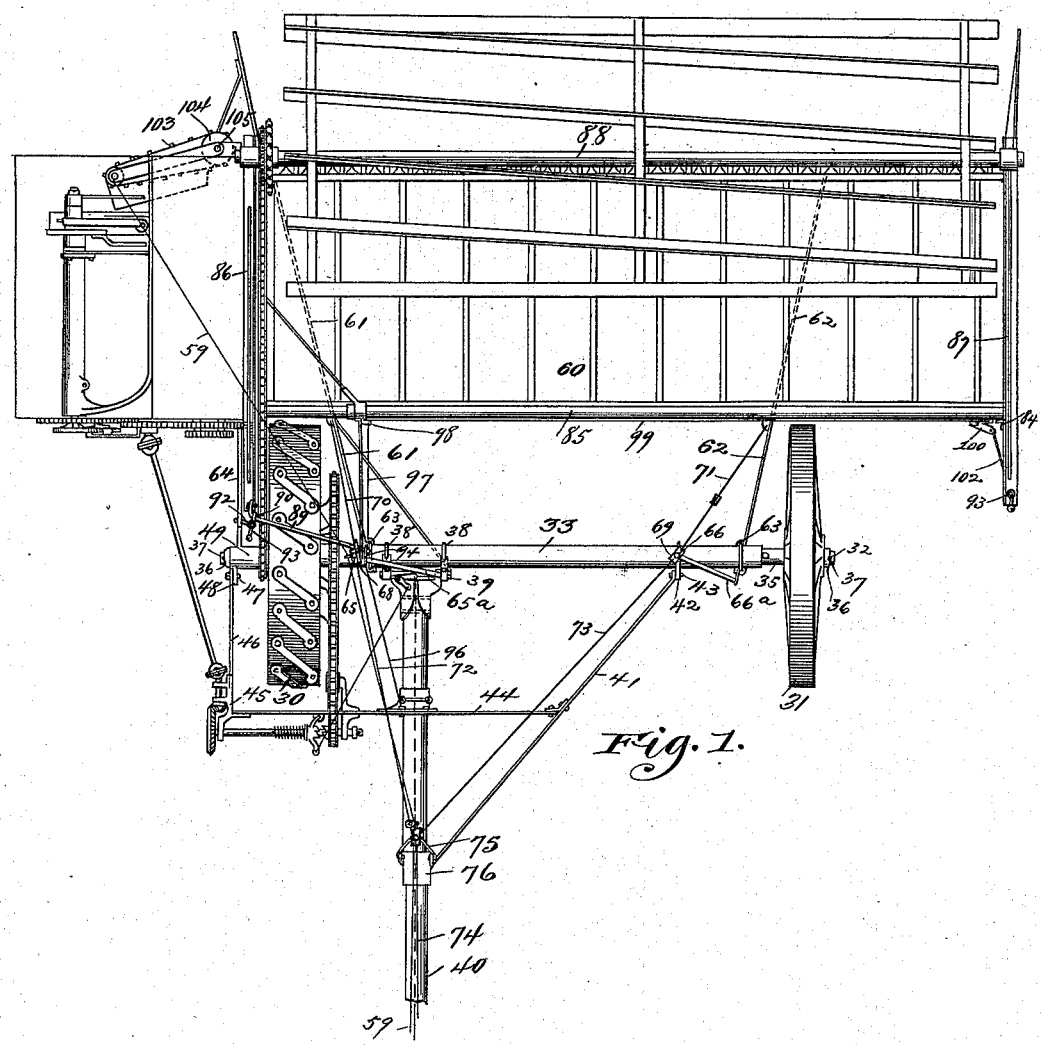

(No Model.) 4 Sheets—Sheet 1.

J. F. APPLEBY.
HARVESTING MACHINERY.

No. 567,935. Patented Sept. 15, 1896.

Witnesses, Inventor,
John F. Appleby
By Offield, Towle & Linthicum
Attys.

(No Model.) 4 Sheets—Sheet 2.
J. F. APPLEBY.
HARVESTING MACHINERY.
No. 567,935. Patented Sept. 15, 1896.
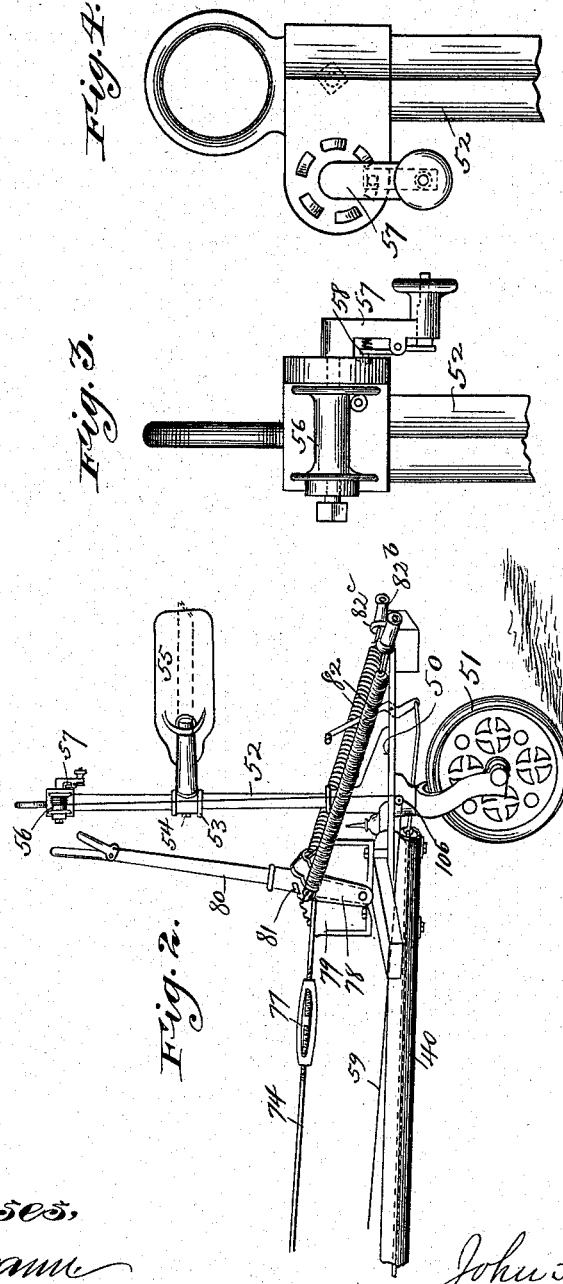
Witnesses,
Inventor:
John F. Appleby
By Offield, Towle & Linthicum
Att'ys.

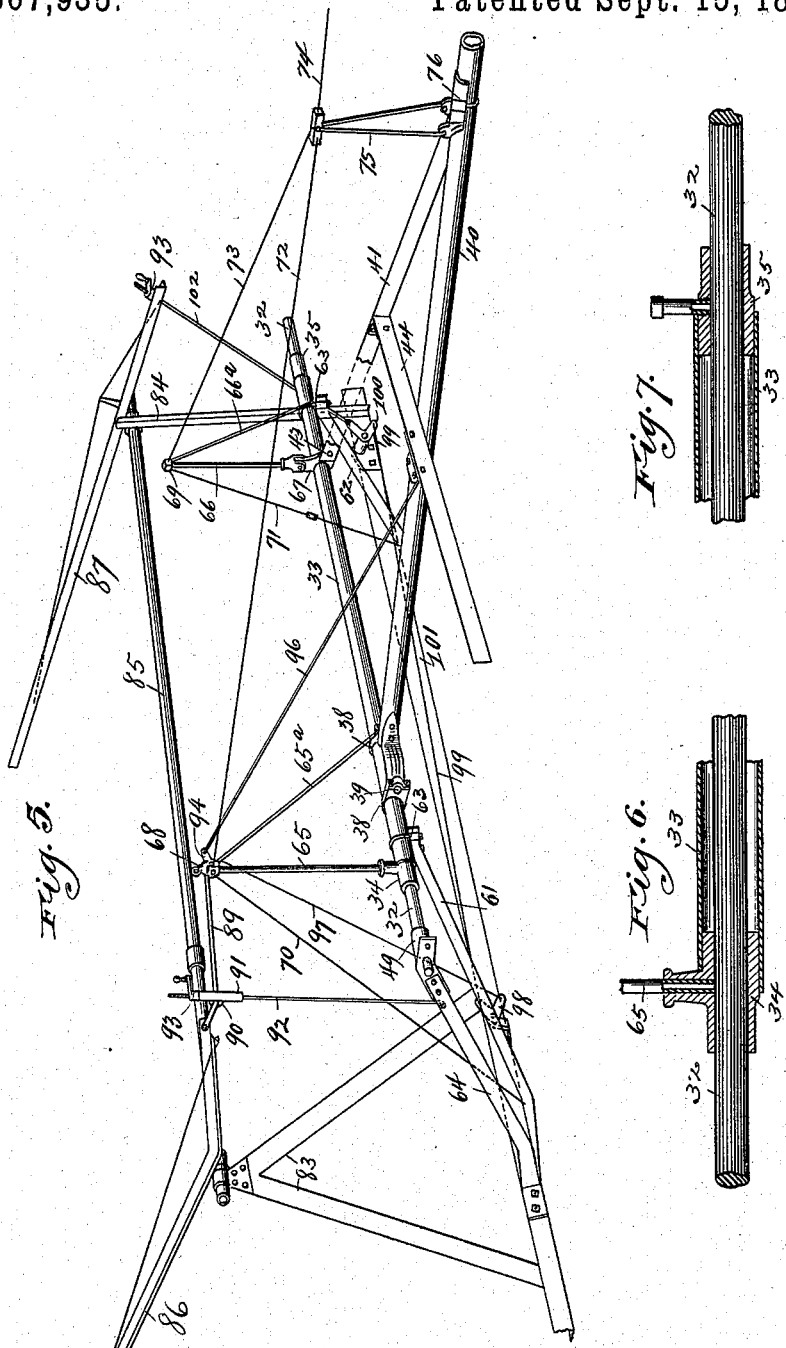

(No Model.) 4 Sheets—Sheet 4.
J. F. APPLEBY.
HARVESTING MACHINERY.
No. 567,935. Patented Sept. 15, 1896.
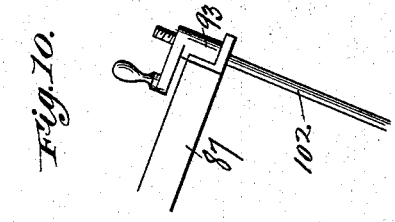
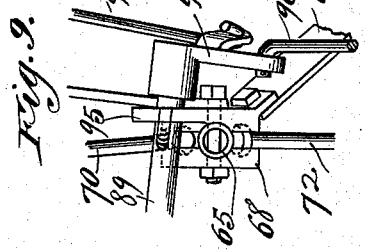
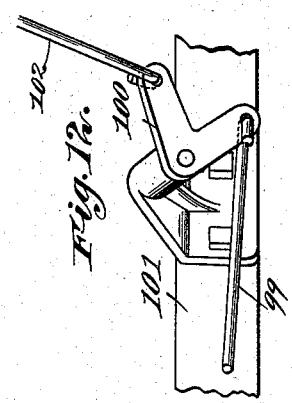
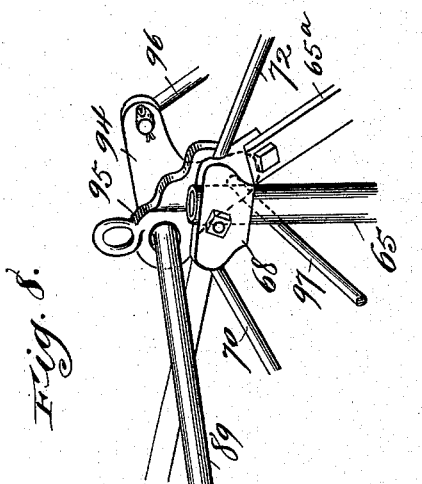
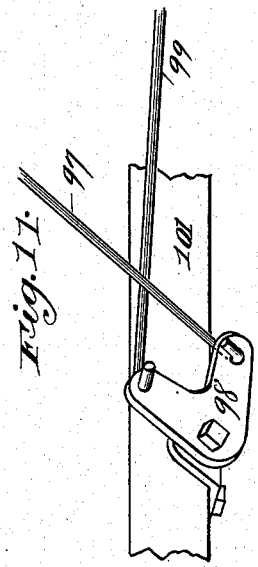

UNITED STATES PATENT OFFICE.

JOHN F. APPLEBY, OF CHICAGO, ILLINOIS, ASSIGNOR, BY MESNE ASSIGNMENTS, TO THE HARVESTER KING COMPANY, OF HARVEY, ILLINOIS.

HARVESTING MACHINERY.

SPECIFICATION forming part of Letters Patent No. 567,935, dated September 15, 1896.

Application filed January 15, 1895. Serial No. 535,000. (No model.)

*To all whom it may concern:*

Be it known that I, JOHN F. APPLEBY, of Chicago, Illinois, have invented certain new and useful Improvements in Harvesting Machinery, of which the following is a specification.

My invention relates to harvesting machinery, and more particularly to that class of harvesting machinery known as "self-binders."

My invention is embodied in a self-binding harvester wherein the grain-platform is pivotally mounted in front of the ground-wheels parallel to the axle, and having the binding mechanism, which I denominate in this specification the "binder," mounted upon one end of said platform. An adjustable reel for carrying the grain into the grasp of the sickle is pivotally mounted upon the framework of the machine, and said framework is all connected and mounted so as to oscillate around the axle of the ground-wheels. Instead of employing the usual draft-tongue, my improved machine has what is denominated a "push-pole," that is to say, a beam which is pivotally connected to the axle of the machine and projects rearwardly from the ground-wheels, the draft-animals being attached to the rear end of said push-pole, which also carries a driver's platform. By a system of levers, rods, and cables carried rearwardly to the driver's platform the driver is enabled to automatically control and vary the position of the platform so as to vary the height of stubble, and also to control the position of the reel to raise or lower it corresponding to the height of grain to be cut. The throwing in and out of gear of the sickle is also controlled from the driver's platform, as is likewise a device called a "butter" for moving the grain endwise in its delivery to the binder, so as to square the butts of the grain and to place them in proper position with relation to the binding mechanism.

In my improved machine the grain-platform is about fifteen feet long and the sickle about twelve feet in length, so that the machine cuts, automatically binds, and delivers out of the path of the draft-animals a swath of grain twelve feet wide, and the capacity of my improved machine is about thirty to thirty-five acres per day under average conditions. The binding mechanism is mounted upon one end of this long platform and occupies only about three feet of the length thereof.

My present invention has more particular reference to the tilting mechanism, whereby the grain-platform and the parts mounted upon and connected therewith are oscillated or rocked around the axle to vary the height of stubble cut by the machine.

My invention further relates to means whereby the reel may be adjusted manually and independently of the tilting of the platform, and also to means whereby the butter may be adjusted for operation with different lengths of grain independently of the movements of the other parts, as well as simultaneously therewith.

In the accompanying drawings, Figure 1 is a plan view of the machine, a section of the push-pole broken away. Fig. 2 shows in perspective the rear end of the push-pole, the driver's platform, steering-wheel, counterbalancing-springs, and the parts mounted on the driver's platform. Figs. 3 and 4 are detail views of the cable-drum mounted on the upper end of a standard at the driver's platform. Fig. 5 is a perspective view showing a skeleton outline of the frame parts which are connected with the axle of the machine, the ground-wheels and other parts being omitted. Figs. 6 and 7 are broken sectional detail views of portions of the axle and showing the bearings of rotatable parts mounted thereon. Figs. 8 to 12, inclusive, are views showing details of the mechanism for raising and lowering the reel.

In the accompanying drawings I have designated the several parts requiring special description by numerals.

30 31 designate the ground or carrying wheels, which are connected by the axle 32, the latter being a solid shaft, and the wheel 30 being connected rigidly with said shaft and constituting the driving-wheel for the gearing of the machine. A tubular beam 33 is sleeved over said axle, and short sleeve-sections 34 35 are fitted to, but turn freely on, the axle, with their ends entering the ends of the sleeve 33. Said short sleeves 34 35 abut at their outer ends against the ground-wheels 30 and 31, which are confined upon the axle 32 by the washers 36 and pins 37. Clamps 38 are secured over the sleeve 33 and are perforated in the rear of said sleeve for the passage of a pivot-bolt 39.

40 represents the push-pole, which is a tubular beam and which has at its forward end perforated lugs registering with apertures in the clamps 38, and which is pivotally connected to said clamps by the passing of the pivot-bolt 39 through the apertures of the several lugs. A brace 41 extends diagonally from the push-pole at some distance back of the axle outwardly to a perforated lug 42, carried by a clamp on the tubular beam 33, and is pivotally connected thereto by the short pivot-bolt 43. A brace-bar 44 is connected to said diagonal brace 41, and having a proper bearing on the push-pole projects rearwardly of the main drive-wheel to a point beyond a line parallel to the face thereof, where it carries a gear-frame 45. A bar 46 projects forwardly from said gear-frame parallel to the face of the drive-wheel, and is pivotally connected by the pivot-bolt 47 to a lug 48 on the sleeve-casting 49, mounted upon the outer end of the axle. It will be observed that the pivot-bolts 39, 43, and 47 are in line, so that there may be a hinge or rocking movement of the beam 33 with reference to the push-pole 40, its braces, and connections. The push-pole at its rear end, as will be observed by reference to Figs. 1 and 2, carries a driver's platform 50. A steering-wheel 51 has a vertical shank journaled in the platform and a standard 52 is connected with said shank and rises above the platform. The standard 52 is provided with a sleeve 53, adjustable up and down on the standard and having a set-screw 54 for fixing it in place, and said sleeve has a support on which is pivoted the steering-arm 55, which is straddled by the driver, who controls it with his legs; but it is capable of being turned with its broad side into a horizontal plane, so as to afford a seat for the driver. Upon the upper end of said standard is mounted a drum 56, having an operating-crank 57, provided with a locking-dog 58. A cable 59 is made fast to said drum and is extended forward to a butter, which will be presently described.

The manner of supporting the platform with the binder mounted thereon will now be described. Referring to Figs. 1 and 5, 60 represents the platform, which is mounted upon the carrying-arms 61 62. These arms are secured at their rear ends to the tubular beam 33 by the clips 63. These platform-carrying arms diverge slightly at their forward ends and pass beneath the platform 60, the latter being substantially rectangular in form. A brace 64 extends from the sleeve 49 on the axle and is connected with the platform, as shown in Fig. 5. The rear ends of these platform-carrying arms and of the brace 64 are therefore capable of rocking around the axle, and as the platform and the parts mounted thereon are fixedly secured to said carrying-arms it follows that the platform itself may be rocked around the axle.

The mechanism for suspending and rocking the platform will next be described. There is provided (see Fig. 5) two upright standards 65 66, the standard 65 being secured with the short sleeve 34 (see Fig. 6) and the standard 66 being mounted on a clamp 67, secured on the tubular beam, being the same part having the perforated lug 42, to which the brace 41 is connected. The upper ends of said standards are provided with caps 68 69. Suspension-rods 70 71 are connected at their upper ends to said caps and projecting forward and downward are connected to the platform-carrying arms 61 62 at the rear edge of the platform 60. The upper ends of the standards 65 66 are connected with a tilting-lever at the driver's platform by the three pull-rods 72, 73, and 74. The pull-rods 72 and 73 converge at their rear ends and are connected to the top of a swinging brace 75, said brace being of substantially triangular form and its members diverging toward their lower ends and being connected pivotally to a casting 76, clamped on the push-pole. The pull-rod 74 is provided toward its rear end with a turnbuckle 77 and at its extremity is connected with a yoke 78, pivoted to a rack-casting 79, the latter being fixed on the platform.

65$^a$ and 66$^a$ represent braces for the standards 65 and 66.

80 represents the platform-tilting lever, which has a dog 81, adapted to engage the teeth of the ratchet to prevent, until withdrawn, the forward movement of the lever. The pull of the platform normally tends to hold the yoke 78 against the rear side of the tilting-lever, and in order to counterbalance the weight of the platform the heavy extension-springs 82 are connected at their forward ends to the yoke and at their rear ends to the platform. With the described arrangement the lowering of the platform is effected by the withdrawal of the dog 81 from the teeth of the ratchet, whereupon the weight of the platform and the parts supported thereby will tend to lower it, extending the springs 82, but the springs, thus extended, have a powerful retractile force, which is utilized to assist the operator of the machine in elevating the platform and its load, which is accomplished by throwing back the lever 80, thus forcing the yoke backward and drawing upon the pull-rods and upon the upper ends of the standards and through the suspension-rods raising the platform, the rocking movement taking effect about the axle as its center. It is intended that the springs shall be of such strength and shall be so adjusted as to perfectly counterbalance the platform and the parts supported thereby. Provision is made for regulating the tension of such springs by threading the extended ends 82ª, which pass through apertured lugs 82ᶜ on the platform, and applying the cap-nuts 82ᵇ to the threaded ends beyond the lugs. By this arrangement it is only necessary for the operator of the machine to exert sufficient force to overcome the friction of the pivotal parts in adjusting them. It will be observed that the push-pole, the beam 33, and the standards are of tubular construction, whereby is secured the maximum strength and lightness. It is also to be observed that by reason of the peculiar construction of the swinging brace, to which the pull-rods are severally connected, the movement of the standards must take place in right lines, thus preventing any tilting or tipping of the platform endwise and causing it to be raised evenly throughout its length. I have provided in the suspension-rod 71 a turnbuckle, which is employed for the purpose of leveling the grain-platform whenever such adjustment becomes necessary in the construction or operation of the machine.

Referring again to Figs. 1 and 5, the manner of mounting the reel will be understood. The reel is supported on a frame which is mounted upon the braces or standards 83 84, which are supported upon the platform. These standards support at their upper ends a pipe 85, and reel-bearing arms 86 87 have a rocking support upon said pipe, the rear ends of said reel-bearing arms projecting rearwardly behind the pipe and the rear end of the arm 86 being upturned. The forward ends of the reel-bearing arms 86 and 87 have journal-boxes for the reel-shaft 88. The upturned end of the arm 86 has connected to it a bent rod 89, which passes above the drive-wheel and through a keeper 90 on a sleeve 91, carried by a rod 92, extending upward from the brace 64. The upper end of the rod 92 is threaded and an adjusting-nut 93 is turned thereon, so as to provide for manual adjustment up and down of the rear end of the reel-carrying arm 86. The bent rod 89 carries, as will be seen in Figs. 8 and 9, a bell-crank 94, one end of the rod 89 passing through an apertured lug 95 on the cap 68 of the standard 65. One arm of said bell-crank is pivotally connected with one end of a thrust-rod 96, the rear end of said rod being secured to the push-pole. The other arm of the bell-crank 94 is connected by a rod 97 with a pivoted bell-crank 98, which is in turn connected by a rod 99 with one arm of a bell-crank 100, both of the bell-cranks last mentioned being pivoted on the rear bar 101 of the platform-frame. The bell-crank 100 is connected by a rod 102 with the rear end of the reel-carrying arm 87, an adjusting-nut 93 being turned on the threaded end of said rod. Now it will be understood that when the standards 65 and 66 are rocked the pivot of the bell-crank 94, carried on the upper end of the standard 65, will be moved, but the thrust-rod 96 will cause said bell-crank to oscillate, and the latter, being secured to the bent rod 89, will rock said rod, thus acting directly to move the rear end of the reel-carrying arm 86, the rocking of the rod 89 being compelled by its passing through the keeper. The oscillation of the bell-crank 94 also acts through the rod 97, bell-crank 98, rod 99, bell-crank 100, and rod 102 to move the rear end of the reel-bearing arm 87, and the reel-bearing arms being pivoted on the pipe 85 the result is that their forward ends carrying the reel are raised.

From the foregoing description it will be seen that whenever the platform is raised or lowered the reel will, by the same movement, be raised or lowered, but the platform swings about the axle as its axis while the reel swings about an axis in front of the axle and the thrust-rod accelerates the movement of the reel, and the latter moves faster both in its upward and downward adjustment than the platform. Stated in another way, the reel partakes of the movement of the platform, but has an independent or added movement transmitted through its tilting mechanism.

In order to move the grain into proper position with reference to the binding mechanism and to bring the butts of the stalks to an even position, I employ a device called a "butter" and shown in Fig. 1. Said butter consists of an endless belt 103, carried over suitable rollers, one of which is marked 104 and is driven from the shaft 105 by a suitable train of gearing. The forward end of the butter is free and it can be drawn inwardly by means of the cable 59, which is led through suitable guides back to a sheave 106 at the driver's platform and thence extended upwardly and wound upon the drum 56. The butter is adjusted automatically by the raising and lowering of the platform, and it may also be adjusted manually by winding or unwinding it by means of the drum.

I claim—

1. In a self-binding harvester, the combination with the ground-wheels and their axle, of a tubular beam sleeved upon the axle, a grain-platform arranged in front of the ground-wheels and connected to the tubular beam, a push-pole hinged to the beam and extending rearwardly therefrom and supporting the driver's platform, a reel mounted upon said platform and adapted to rock in its bearings, means extending to the driver's station for rocking the platform and a rigid thrust-rod connected with the push-pole at one end and at the other to the reel whereby when the platform is rocked around the axle the movement of the reel is accelerated, substantially as described.

2. In a self-binding harvester, the combination with the ground-wheels and their axle, of a platform arranged in front of the ground-wheels and a push-pole extending rearwardly therefrom, a binding mechanism mounted upon one end of the platform, means for elevating the grain to said binding mechanism and a pivoted butter with connections extending to the driver's station at the rear end of
5 the push-pole, and means for raising and lowering the grain-platform and reel and whereby the butter is adjusted automatically when the grain-platform is adjusted, substantially as described.

JOHN F. APPLEBY.

Witnesses:
FREDERICK C. GOODWIN,
N. M. BOND.